United States Patent [19]

Eddy

[11] 4,047,452

[45] Sept. 13, 1977

[54] BELT CONVEYOR DRIVE MECHANISM

[75] Inventor: Robert Truman Eddy, South Bend, Ind.

[73] Assignee: Reliance Electric Company, Mishawaka, Ind.

[21] Appl. No.: 667,022

[22] Filed: Mar. 15, 1976

[51] Int. Cl.² ............................................. F16H 3/74
[52] U.S. Cl. .................................. 74/752 C; 74/337; 198/854; 74/731
[58] Field of Search ............... 198/854, 855, 789, 791; 74/752 C, 751, 335, 336 R, 337, 789, 790, 791

[56] References Cited

U.S. PATENT DOCUMENTS

| | | | |
|---|---|---|---|
| 2,286,485 | 6/1942 | Hild | 74/751 |
| 2,775,910 | 1/1957 | Wilkerson | 74/752 C |
| 3,055,237 | 9/1962 | Magnuson | 74/789 |
| 3,251,247 | 5/1966 | Lamburn | 74/751 |
| 3,376,758 | 4/1968 | Mackay | 198/854 X |
| 3,443,679 | 5/1969 | Jacobson | 198/854 |
| 3,443,680 | 5/1969 | Brill | 198/854 X |
| 3,938,631 | 2/1976 | Smith | 74/752 C X |

Primary Examiner—James F. Coan
Attorney, Agent, or Firm—Marmaduke A. Hobbs

[57] ABSTRACT

A drive mechanism for a belt conveyor system having a driven pulley and a belt trained thereon, the mechanism including a speed reducer disposed in the pulley and having coaxial input and output shafts, the output shaft being a reaction shaft for the rotatable housing of the speed reducer. The housing of the speed reducer is in axial alignment with the pulley and is connected thereto for driving the pulley. A brake is provided for restraining the rotation of the output shaft, and may consist of a disc rotatable with the output shaft and a hydraulically operated head controlled by a system including a pump driven by the output shaft in response to the load on the belt of the conveyor. The drive for the pump senses the load on the conveyor belt by the reaction response of the output shaft, thereby varying the rate at which the pressure in the hydraulic system increases to control the friction head indirectly in response to the conveyor load. A second brake, which may be a disc type with a hydraulically operated caliper head, is preferably included for controlling the conveyor system.

13 Claims, 5 Drawing Figures

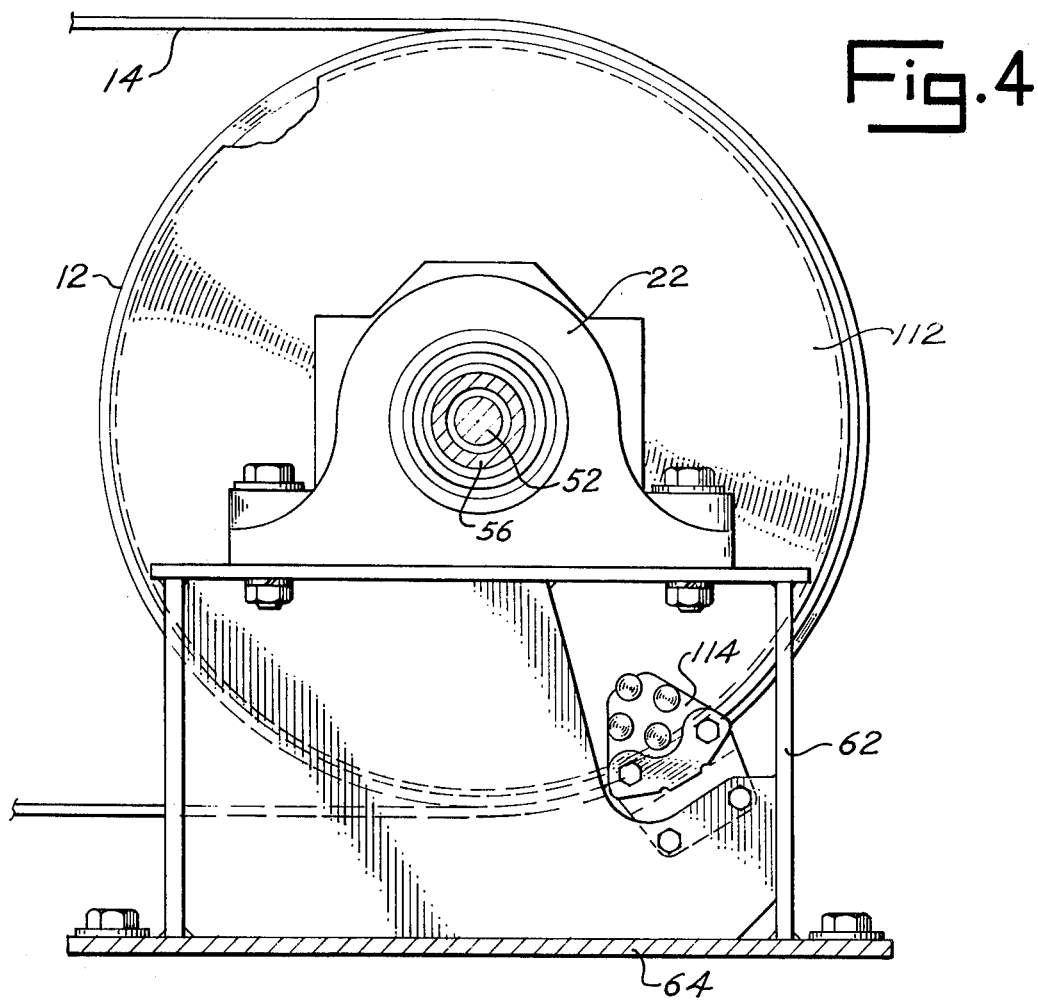
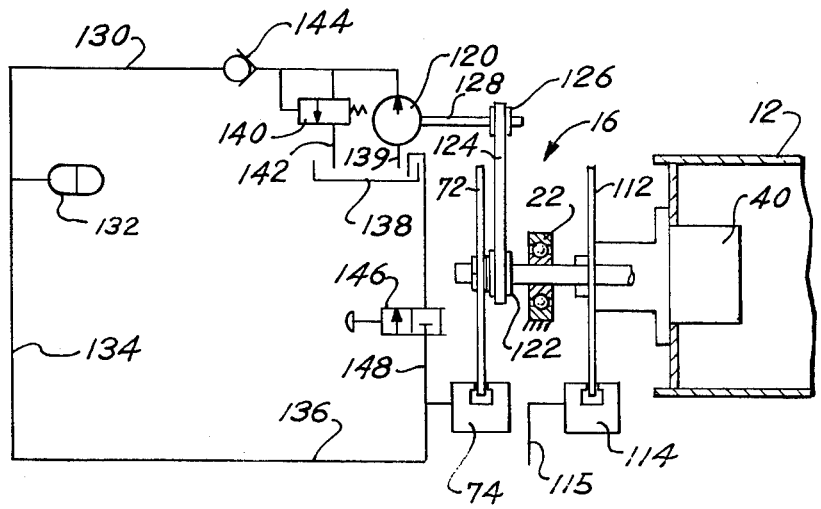

BELT CONVEYOR DRIVE MECHANISM

Belt conveyors used for handling heavy materials such as ore, coal, rock and the like are often driven by a motor through a speed reducer connected to the shaft of one of the pulleys on which the belt is trained. The motor and speed reducer may be installed at the end of the driven pulley, or the motor may be installed at the end of the pulley with the speed reducer mounted in the driven pulley as an integral installation. In the latter type of installation, the motor drives the speed reducer through a shaft axially disposed in the main pulley shaft, and the speed reducer reacts directly on the pulley to provide the drive torque therefor. The present invention is primarily concerned with the latter type, and is constructed and designed to be responsive to the load on the belt at the time of starting to provide the required torque to effect a soft start, regardless of the load on the belt, thus avoiding a quick start, normally involving a sudden jerk, when the belt is unloaded or has only a light load. The sudden starts of belt conveyors with no load or light load may result in damage to the belt system or cause the belt to loosen to the extent that the conveyor fails to operate, or operates inefficiently. It is therefore one of the principal objects of the present invention to provide a conveyor drive mechanism which senses the load condition on a conveyor belt and provides a soft start regardless of the load, and which applies a variable driving force to the driven pulley of the conveyor in response to the load and acceleration requirements, and maintains a smooth operating performance of the conveyor system.

Another object of the invention is to provide a conveyor belt drive mechanism which controls the torque output from the speed reducer to the drive pulley in accordance with the load and in response to acceleration rate during the starting operation, and which utilizes a hydraulic system both for sensing the acceleration rate and for controlling the speed reducer output in response thereto.

Still another object of the invention is to provide a conveyor drive mechanism of the aforesaid type which is simple and compact in construction and efficient in operation, and which includes an integral speed reducer and pulley controlled by a hydraulically operated brake in response to the load on the conveyor.

Further objects and advantages of the present invention will become apparent from the following description and accompanying drawings, wherein:

FIG. 4 is a vertical cross sectional view of the drive mechanism shown in FIG. 3, the section being taken on line 4 — 4 of the latter figure; and FIG. 5 is a schematic view of a hydraulic system used for controlling the operation of the drive mechanism and conveyor pulley.

Figure 1:
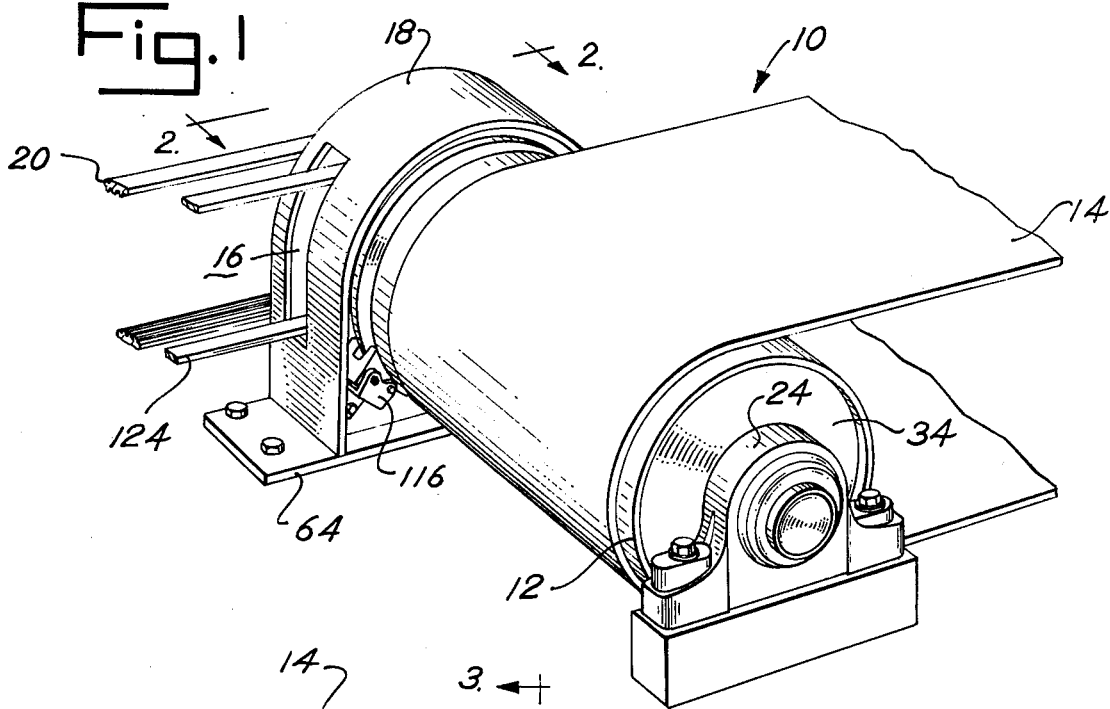
FIG. 1 is a perspective view of a conveyor pulley with a conveyor belt thereon, showing the drive mechanism enclosed in a housing at one end of the pulley.
Figure 2:
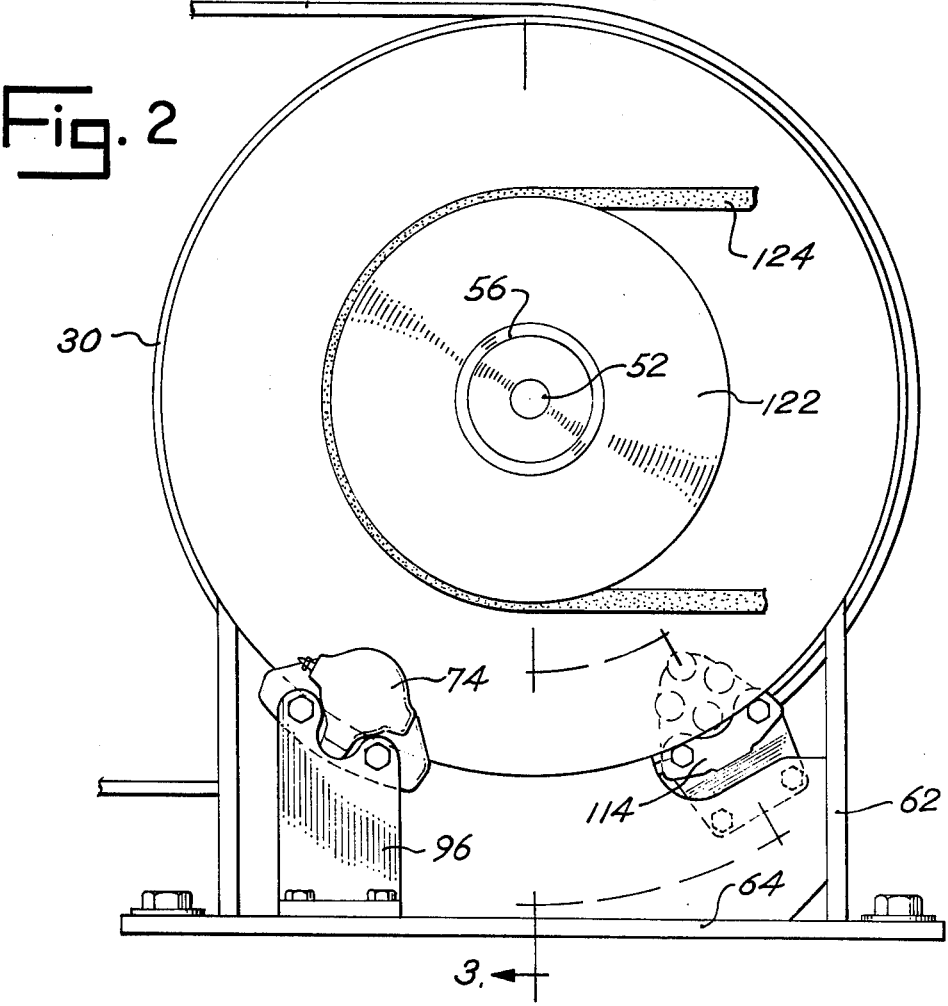
FIG. 2 is an end elevational view of the conveyor assembly as shown in FIG. 1.
Figure 3:
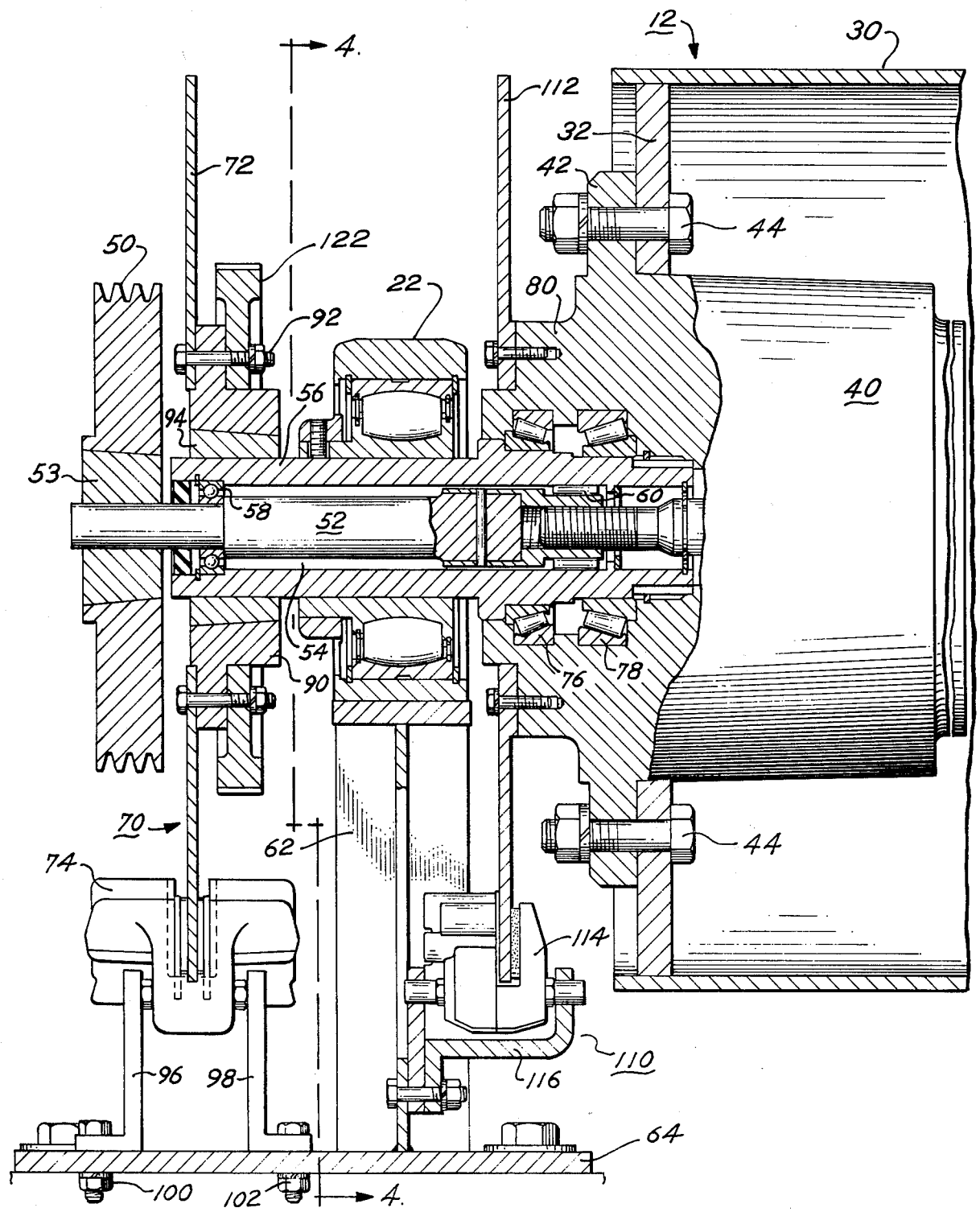
FIG. 3 is a fragmentary cross sectional view of the conveyor pulley shown in the preceding figures, and a vertical cross sectional view of the drive mechanism therefor, the section being taken on line 3 — 3 of FIG. 2.

Referring more specifically to the drawings and to FIG. 1 in particular, numeral 10 indicates generally a conveyor system having a conveyor pulley 12 and a belt 14 trained on said pulley and being driven by a drive mechanism 16 enclosed in housing 18. The drive mechanism is driven from an electrical motor (not shown) through a belt 20, and pulley 12 is supported by pillow blocks 22 and 24. The conveyor shown may be for a variety of different uses, such as, for example, the handling of ore, coal or other granular materials conveyed over long distances, and the belt is trained on a non-driven pulley and supported by a series of idle rollers. Various arrangements of the conveyors and different lengths over a wide range may be used in conjunction with the present drive mechanism.

The pulley shown in the drawings consists of a rim 30 and disc shaped end members 32 and 34 held to the rim by welding or other suitable securing means, and a speed reducer 40 is shown schematically, mounted in the hollow interior of the pulley. The speed reducer, which is of a well known type and will not be described in detail herein, is secured to end member 32 by an annular flange 42 and a plurality of bolts 44 extending through end member 32 and flange 42. The speed reducer is driven by the electric motor through belt 20 and sheave 50 mounted on the end of input shaft 52 by a bushing 53, the input shaft being disposed in the hollow interior 54 of main shaft 56, and is rotatable relative thereto in bearings 58 and 60. The input shaft 52 is connected to the input gear (not shown) of the speed reducer 40, and the output gear of the speed reducer is connected to main shaft 56, the latter shaft being journalled in pillow block 22, which is rigidly supported by frame 62 seated on a mounting plate 64, which in turn is connected to a suitable support, such as a footing or foundation. Rotation of shaft 52 drives the gears in the speed reducer, which in turn drives the output shaft 56, the output shaft being free to rotate until restrained in the manner more fully described hereinafter.

The restraining mechanism for shaft 56 shown in the drawings consists of a brake, indicated generally by a numeral 70, having a friction member such as brake disc 72 and a friction head such as caliper head 74 which clamps the brake disc and restrains the rotation of main shaft 56. When shaft 56 is restrained in the foregoing manner, the torque output of the speed reducer is transmitted through flange 42 to the pulley for driving the conveyor belt. The speed reducer is journalled on main shaft 56 by two roller bearing seats 76 and 78 seated in an extension 80 of the speed reducer housing. Brake disc 72 is mounted on an annular ring 90 and is secured thereto by a plurality of bolts 92 extending through the inner edge of the brake disc 72 and ring 90, the ring being secured to the shaft by split bushing 94, or by any other suitable securing means. Head 74, which is hydraulically operated, is mounted on support members 96 and 98, which in turn are secured to plate 64 by bolts 100 and 102, respectively.

A brake assembly 110 includes a brake disc 112 mounted on extension 80 of speed reducer 40, thus directly connecting the disc 112 to the pulley. The brake disc 112 is controlled and restrained by a hydraulically operated caliper brake head 114 mounted by a bracket 116 on frame 62. The brake, which is primarily used to prevent prolonged coasting after the power for driving the conveyor has been interrupted, is controlled by a suitable hydraulic system, not shown in detail, although represented schematically in FIG. 5, connected to the brake head by hydraulic line 115.

FIG. 5 shows schematically a hydraulic system for controlling friction head 74 of brake 70. Since the amount of torque and speed transmitted from the speed reducer to the pulley is controlled by controlling the rotation of shaft 56 through brake 70, the hydraulic system is used to control the friction head by a hydraulic pump 120 driven through pulley 122, belt 124 and pulley 126, and by shaft 128 of pump 120. Upon operation of the pump, the pressure of the hydraulic fluid in line 130 increases, and this increased pressure is transmitted to cumulator 132 and through lines 134 and 136 to friction head 74. The pump inlet is connected to a reservoir 138 by line 139, and a pressure control valve returns the excess fluid through line 142 to the reservoir. The check valve 144 prevents the return of the fluid from head 74 to the pump, the pressure in friction head 74 being relieved by manually controlled valve 146 in line 148 connecting the head to reservoir 138. The schematic diagram shows a simplified system, and is included to illustrate the fundamental construction and operation of the brake control. The speed at which pump 120 is driven in the initial acceleration determines the length of time required for the hydraulic system to build up an operating pressure in lines 130, 134 and 136 and in cumulator 132, and thereafter to apply an effective restraining force on disc 72 by head 74.

If the conveyor is unloaded, or has only a light load, output shaft 56 tends to accelerate more slowly than when the conveyor is loaded; thus pressure operating head 74 to restrain disc 72 is of a lower value and builds up more slowly. Thus head 74 applies a lower pressure to the brake permitting it to slip, and thereby causing the speed reducer to apply a lower torque to the belt. This avoids a sudden or jerking start of the conveyor and provides a smooth acceleration of the belt. If, on the other hand, the conveyor is heavily loaded, the reaction of shaft 56 to the inertia of the load on the belt causes the shaft 56 and pulley 122 to rotate at a faster rate, thereby increasing the output of pump 120, which in turn rapidly increases the pressure in the cumulator and hydraulic lines to head 74. The increased pressure applied by the head to disc 72 effectively restrains the disc and results in the speed reducer applying a high torque to the pulley to drive the loaded belt. Check valve 144 provides a closed system to operate head 74 in restraining disc 72. Thus when the conveyor is in full operation, disc 72 is held in nonrotating position by head 74, thus causing the speed reducer to transmit its full torque capacity to the pulley and thence to the conveyor belt.

In the operation of the present belt conveyor drive mechanism, the drive motor is started, thus rotating pulley 50 and shaft 52 to drive speed reducer 40. The output of the speed reducer is transmitted to shaft 56, which in turn drives pump 120 in the manner previously described herein to control the rotation of brake disc 72 in accordance with the load on the conveyor. As head 74 applies the pressure to restrain the rotation of disc 72, the capacity of the speed reducer is increased until its full capacity is applied to its pulley. Throughout the normal operation of the hydraulic system, i.e. when the system has reached normal operating speed, head 74 firmly holds disc 72 in nonrotating position. When the conveyor system is shut down, coasting is prevented by the application of brake 110 through hydraulic head 114, which applies a restraining influence on the rotation of the brake disc 112, thus increasing the rate of deceleration of the conveyor and eliminating prolonged coasting.

The hydraulic system for brake 70 and for the hydraulic brake may be integrated so that the two can be operated from the same source and controlled in such a manner that the brake will automatically be applied upon shutting off the input of the drive motor or by operation of control valve 146. When this control valve is opened, the pressure transmitted from the pump to head 74 is relieved, thus permitting the brake disc 72 and reaction shaft 56 to rotate, thereby rendering the speed reducer incapable of driving the conveyor.

While only one embodiment of the present belt conveyor drive mechanism has been described in detail herein, various changes and modifications may be made without departing from the scope of the invention.

I claim:

1. A drive mechanism for a belt conveyor system having a driven pulley and a belt trained thereon, said mechanism comprising a speed reducer having a housing drivingly connected to said driven pulley, a power input shaft for said speed reducer and reaction output shaft for said speed reducer disposed coaxially around said input shaft, a disc brake member connected to said reaction output shaft for rotation therewith, a friction head for restraining the rotation of said disc brake member, and means responsive to the load on the conveyor belt for controlling the restraining effect of said head on said brake member.

2. A drive mechanism for a belt conveyor system as defined in claim 1 in which said head is of the caliper type.

3. A drive mechanism for a belt conveyor system as defined in claim 1 in which said means responsive to the load of the conveyor belt includes an element rotatable with the reaction output shaft of the speed reducer.

4. A drive mechanism for a belt conveyor system as defined in claim 2 in which said means responsive to the load of the conveyor belt includes an element rotatable with the reaction output shaft of the speed reducer.

5. A drive mechanism for a belt conveyor system as defined in claim 1 in which a brake means is provided for controlling said pulley.

6. A drive mechanism for a belt conveyor system as defined in claim 5 in which said brake means includes a disc and a caliper type head for restraining the rotation of said disc.

7. A drive mechanism for a belt conveyor system as defined in claim 3 in which said head is hydraulically operated and a hydraulic pump is driven by said element in response to the speed of said reaction output shaft, and a line having a cumulator therein connects said pump with said head.

8. A drive mechanism for a belt conveyor system as defined in claim 5 in which said head is hydraulically operated and a hydraulic pump is driven by said element in response to the speed of said reaction output shaft, and a line having a cumulator therein connects said pump with said head.

9. A drive mechanism for a belt conveyor system as defined in claim 6 in which the head for said brake means is hydraulically operated.

10. A drive mechanism for a belt conveyor system as defined in claim 5 in which said brake means includes a disc connected to said pulley and a hydraulically operated head for restraining the rotation of said disc.

11. A drive mechanism for equipment, comprising a speed reducer having a rotatable housing, means rotatable with said housing for connection to the equipment, a power input shaft for said speed reducer and reaction output shaft for said speed reducer disposed coaxially around said input shaft, a disc brake member connected to said reaction output shaft for rotation therewith, a friction head for restraining the rotation of said disc brake member, and means responsive to the load on the equipment for controlling the restraining effect of said head on said brake member.

12. A drive mechanism as defined in claim 11 in which said head is of the caliper type.

13. A drive mechanism as defined in claim 11 in which said means responsive to the load includes an element rotatable with the reaction output shaft of the speed reducer.

* * * * *